May 3, 1927.
F. C. BUCKNAM
1,627,479
SHRIMP SHELLING MACHINE
Filed Feb. 19, 1927
4 Sheets-Sheet 1
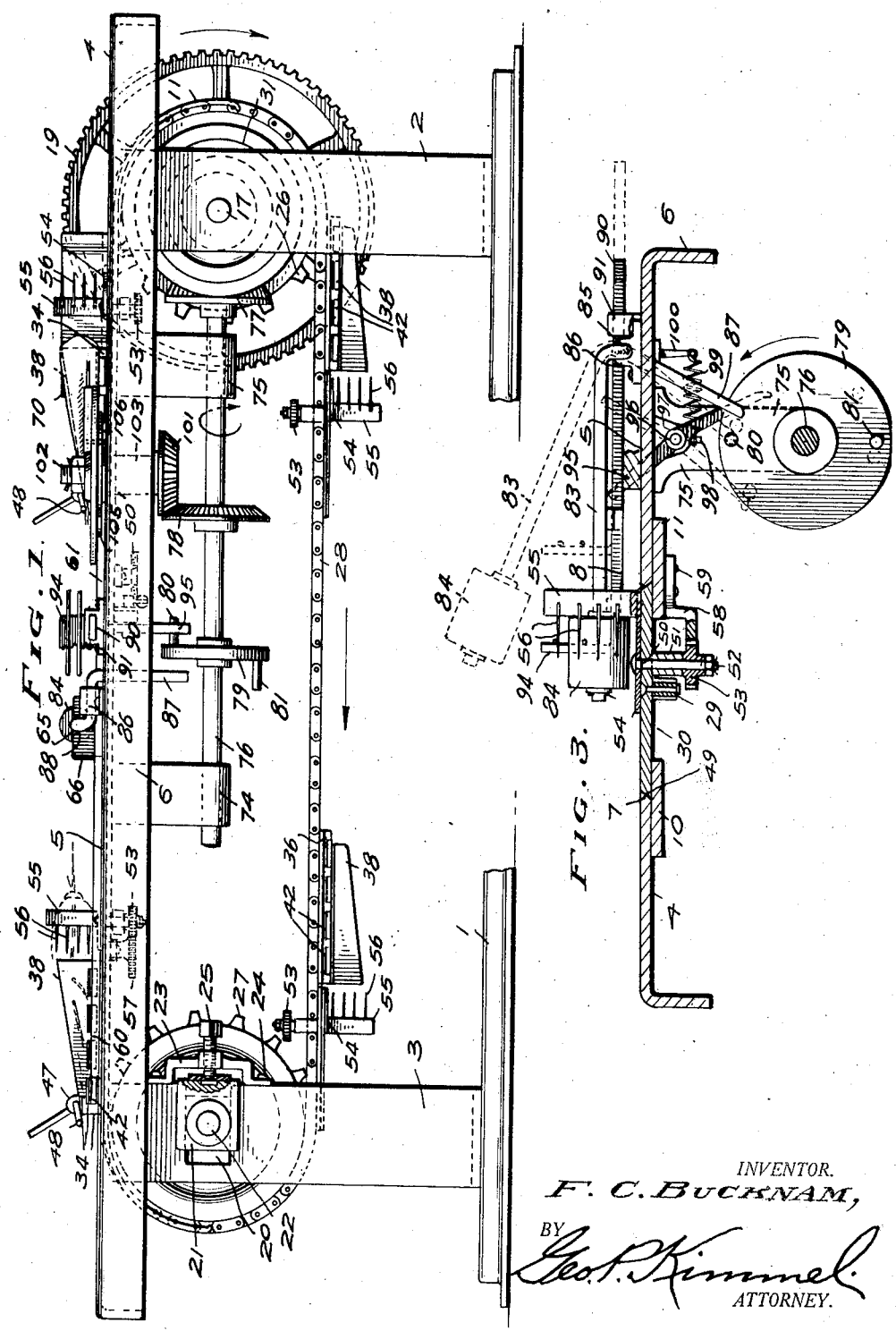
INVENTOR.
F. C. BUCKNAM,
BY
Geo. F. Kimmel
ATTORNEY.

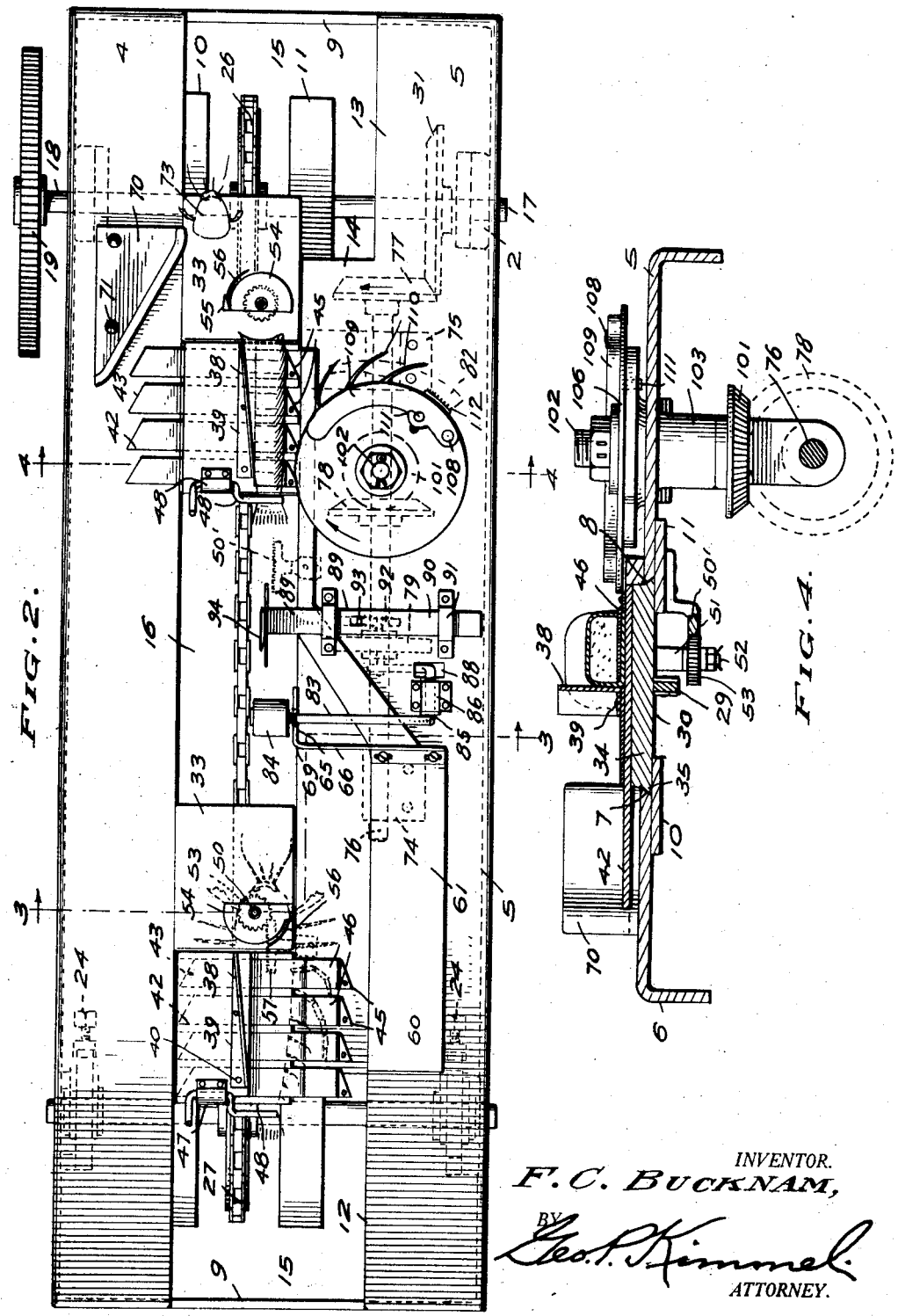

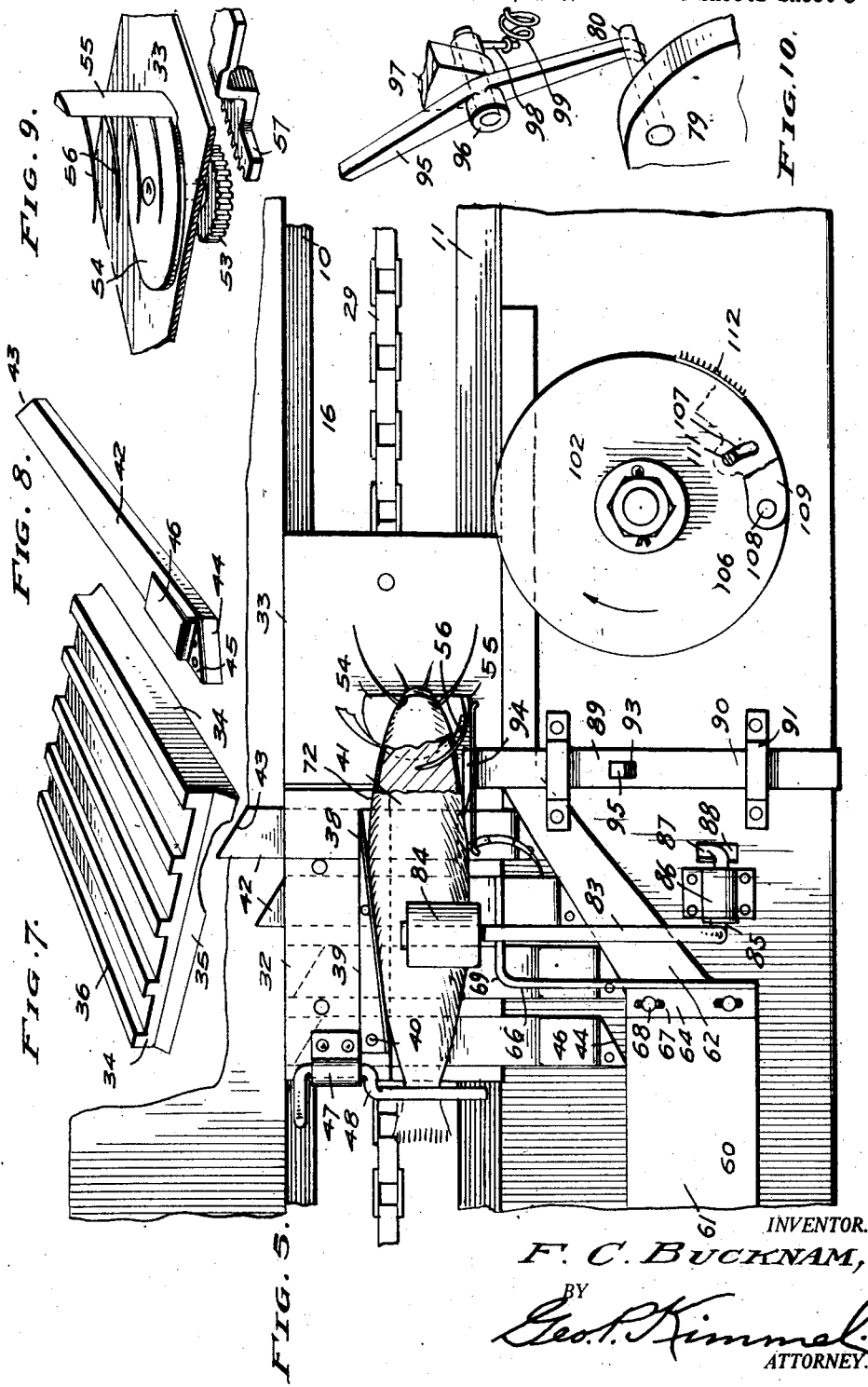

May 3, 1927.
F. C. BUCKNAM
1,627,479
SHRIMP SHELLING MACHINE
Filed Feb. 19, 1927
4 Sheets-Sheet 4
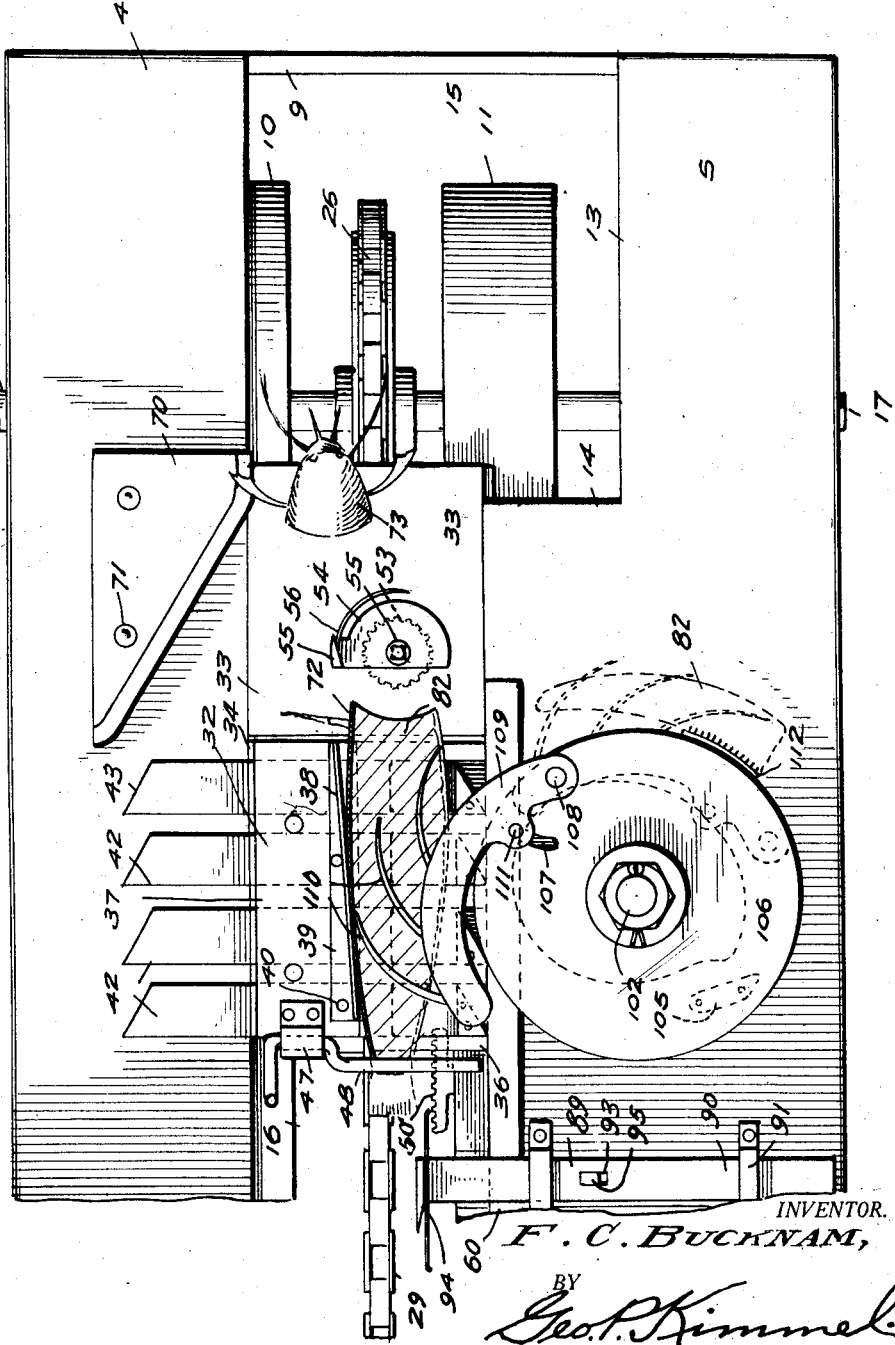
INVENTOR.
F. C. BUCKNAM,
BY
Geo. P. Kimmel
ATTORNEY.

Patented May 3, 1927.

1,627,479

UNITED STATES PATENT OFFICE.

FRANK C. BUCKNAM, OF NEW ORLEANS, LOUISIANA.

SHRIMP-SHELLING MACHINE.

Application filed February 19, 1927. Serial No. 169,593.

This invention relates to a machine for shelling of Crustacea and has for its object to provide, in a manner as hereinafter set forth a machine of such class designed primarily for expeditiously separating the meat from the body part of shrimp.

A further object of the invention is to provide, in a manner as hereinafter set forth, a machine of the class referred to whereby the shrimp can be quickly positioned and held for the separation of the meat therefrom and further whereby the empty shells are readily discarded.

A further object of the invention is to provide, in a manner as hereinafter set forth, a machine of the class referred to for successively acting on the shrimp to quickly fasten it in position, remove the feelers or fins therefrom, freeing the meat at the tail portion thereof, severing the head, removing the meat from the shell in a direction from the forward end of the shell, and then discarding the shell.

Further objects of the invention are to provide, in a manner as hereinafter set forth, a machine for separating the meat of shrimp from the body or shell part thereof, and which is comparatively simple in its construction and arrangement, strong, durable, thoroughly efficient in its use, readily assembled, and comparatively inexpensive to set up.

With the foregoing and other objects in view the invention consists of the novel construction, combination and arrangement of parts, as hereinafter more specifically described, and illustrated in the accompanying drawings, wherein is shown an embodiment of the invention but it is to be understood that changes, variations and modifications can be resorted to which fall within the scope of the claims hereunto appended.

In the drawings wherein like reference characters denote corresponding parts throughout the several views:

Figure 1 is a side elevation of a machine for the shelling of Crustacea in accordance with this invention.

Figure 2 is a top plan view thereof.

Figure 3 a section on line 3—3 Figure 2.

Figure 4 is a section on line 4—4 Figure 2.

Figure 5 is a fragmentary view upon an enlarged scale, in plan, of the machine at the shrimp receiving end thereof.

Figure 6 is a view similar to Figure 5 at the meat removing end of the machine.

Figure 7 is a perspective view, partly broken away, of one of the carriers.

Figure 8 is a perspective view of one of the holder bars.

Figure 9 is a fragmentary view disassembled and in perspective of the head cutter.

Figure 10 is a fragmentary view, in perspective, of the feeler or fin cutter bar shifting means.

The machine comprises a base 1 carrying a forward and a rearward pair of standards 2, 3 respectively and with the standards of each pair opposing each other and arranged in spaced relation and secured upon the upper ends of said standard is a sectional platform or table and with the sections thereof arranged in spaced relation and indicated at 4, 5. The ends and outer sides of the said sections are formed with down-turned flanges 6, the inner side edge of the section is under-cut as indicated at 7 and the inner side edge of the section 5 is under-cut as indicated at 8, see Figures 3 and 4. The sections are connected together at their ends by coupling bars 9. Secured to the lower face of the section 4 and projecting beyond the edge 7 and towards the section 5 is a supporting member 10 of less length than the length of the section 4. Secured to the lower face of the section 5 and projecting from the edge 8 thereof and towards the section 4 is a supporting member 11 of less length than the section 5. The section 4 is of the same width from end to end and the section 5 is constructed with a pair of end portions 12, 13 of the same width as the width of section 4 and an intermediate portion 14 of materially greater width than the width of the section 4, see Figure 2. The intermediate portion 14 is of greater length than the combined length of the end portions 12, 13. By this arrangement the opening formed between the sections 4, 5 has the end portion 15 thereof of materially greater width than the intermediate portion 16 thereof. The end portions 15 of the opening, formed between the sections 4, 5 are offset with respect to the intermediate portion 16 of such opening, see Figure 2.

Only one of the standards 2 is illustrated and only one of the standards 3. Each standard 2 is of like construction and each standard 3 is of like construction. The standards 2, 3 have their upper ends arranged against the inner faces of the side flanges 9 of the sections 4, 5. Each standard 2 between its transverse median and its upper end is provided with an opening 17 and with the openings of the standards 2 aligning, and journaled in said openings is a drive shaft 18, which is of a length to project from the section 4 and is provided with a gear wheel 19, adapted to be connected to a driving means therefor, not shown. Each standard 3, at a point between its transverse median and its upper end is provided with a transversely extending slot 20 which opens at the forward side edge of the standard and carries an adjustable bearing 21, for a transversely extending shaft 22. Each standard 3 is provided with a bracket of yoke-shaped contour at its forward edge and which opposes the open end of the slot 20. The bracket is indicated at 23, is secured to the standard by the holdfast devices 24, and carries an adjusting screw 25 for the bearing 21. In Figure 2, the upper ends of the several standards are indicated in dotted lines.

Carried by the shaft 17, and positioned at the longitudinal median of the part 16 of the opening formed between the sections 4 and 5 is a sprocket gear 26, which is arranged in alignment with a sprocket gear 27 fixed to the shaft 22. Travelling over the sprocket gears 26 and 27 and driven from the gear 26 is an endless conveyor 28 in the form of a sprocket chain. The tensioning of the conveyor 28 is provided by the adjustable bearings 21. The high part of the conveyor 28, which is indicated at 29, Figure 4 travels in the opening 30, formed between the supporting members 10 and 11 and said opening 30 is of less width than the intermediate part 16 of the opening formed between the sections 4, 5, see Figure 4. Secured to and operating with the shaft 18, below the section 5, is a bevelled gear 31 which is employed for a purpose to be presently referred to.

Connected to and bodily transported by the conveyor 28 is a series of carriers referred to generally by the reference character 32. The carriers 32 are arranged in spaced relation and secured to the conveyor 28 and bodily carried therewith are spaced holders 33 and each of which is arranged slightly in advance of a carrier 32.

Each carrier consists of a body portion 34, see Figures 4, 5, 7 and 8, is of greater transverse width than the opening 30 and of the same width as the intermediate part 16 of the opening formed between the sections 4, 5. The body portion 34 is of greater thickness than the depth of said intermediate part 16. The body portion 34 is supported on the members 10 and 11 when the high part 29 of the conveyor 28 travels through the opening 30. The lower part of each side edge of the body portion 34 is bevelled as at 35. The bevels are oppositely disposed and engage the bevelled edges 7, 8 of the sections 4, 5 thereby providing a dove-tail connection to prevent the upward shifting of the body portion 34 relative to the platform, or in other words for confining the body portion 34 as it travels through the intermediate part 16 of the opening formed between the sections 4, 5. The upper face of the body portion 34 is formed with a series of transverse grooves 36 arranged in spaced relation and in parallelism and extending from one side edge to the other side edge of the body portion 34. The ends of the grooves 36 are positioned above the bevelled part 35 of the side edges of the body portion 34. Secured upon the top of the body portion 34 at a point between the longitudinal median thereof and that side edge of the body portion 34 which abuts the section 4 is longitudinally extending retaining plate 37 of the same length as the length of the body portion 34, see Figures 5 and 6. Secured upon the plate 37 is a vertically disposed abutment member 38, which extends lengthwise of the plate 37 and inclines outwardly from its rear to its forward end. The abutment 38 at its bottom is formed with an outwardly extending flange 39 through which extends holdfast devices 40 for rigidly securing the abutment member in position, and the latter at its forward end terminates at the forward end of the body portion 34. The member 38 also constitutes a guide for positioning the shrimp 41 with respect to the carrier, and the latter is of less length than the length of the shrimp, see Figure 6. The shrimp 41 when positioned extends forwardly and rearwardly with respect to the carrier 32. The carrier 32 is illustrated as provided with four grooves 36, but this number can be increased or diminished if desired. The grooves 36 are provided for the reception of a series or sets of transversely shiftable hook-carrying bars 42 and each of which has its ends oppositely bevelled as at 43, 44. Secured to the upper face of each of the bars 42, in proximity to the bevelled end 44, is a hook 45 which is disposed lengthwise with respect to the upper face of the bar 42 and upset with respect thereto. The bill 46 of each hook 45 is positioned above the upper face of the body portion 34 of the carrier, see Figure 4. Pivotally connected as at 47 to the rear end of the plate 37, is a manually operated clamping lever 48 for engagement with the tail of the shrimp to clamp the latter and free the meat therefrom, see Figure 5. The hooks 46 are provided for securing the shrimp 41 on the carrier and the manner in which this action is effected will be presently referred to.

The plate 32 which provides a holder has its side edges bevelled, as indicated at 49 Figure 3 to engage under the edges of the sections 4, 5 see Figure 3, or in other words provide a dove-tail sliding connection between the holder 33 and the sections of the platform and which prevents the moving upwardly of the holder 33 relative to the platform. The holder 33 is provided at a point between its transverse median and rear end and to one side of its longitudinal median with an opening 50, see Figure 3, and integral with the holder 33, and depending from the lower face thereof is a sleeve 51. Extending through the opening 50 and sleeve 51 is a shaft 52, carrying below the sleeve 51 a gear wheel 53. The upper end of the shaft 52 is fixedly secured to a revoluble base 54 see Figure 9 of a combined hook and cutter and the latter is employed for successively catching the shrimp near its head and for severing the latter. The combined hook and cutter consists of a vertically disposed cutter member 55 which is fixedly secured at its lower end to the edge of the base 54 and extending laterally from the cutter member 55 is a series of superposed, curved spaced tines 56 which provide the hook. The tines enter the head of the shrimp prior to the action of the cutter member 55 to sever the head and the severance of the latter is had in advance of separating the meat from the shell. The combined hook and cutter is intermittently operated and for such purpose spaced racks 57, 50' are provided, see Figures 1, 2, 6 and 9 and which is engaged by the gear 53 during the travel of the conveyor 28. Each rack is carried by an angle shaped bracket 58, which is secured by the holdfast devices 59 against the lower face of the supporting member 11. The racks are suspended below the opening 30, see Figure 3 and in the path of the gear wheel 53. The base 54 of the combined hook and cutter is of semi-circular contour see Figure 2. The rack 57 operates the hook and cutter in advance of its operation by the rack 50'.

Secured to the upper face of the section 5 of the platform, is a cam bar referred to generally by the reference character 60 and which is disposed lengthwise with respect to said section 5 and it includes a rear portion 61, a forwardly extending and inwardly inclined intermediate portion 62 and a longitudinally extending forward portion 63. The portion 61 is positioned near the rear end of the section 5 and is spaced from the inner side edge of such section. The intermediate portion 62 projects inwardly at an inclination from the portion 61 and terminates at the inner side edge of the section 5 and the end portion 63 is positioned at the inner side edge of the section 5. The cam bar 60 is of a length to extend from the rear end of the intermediate portion 14 of the section 5, to a point adjacent the forward end of said intermediate portion, see Figure 2. The inner side edge of the end portion 63 of the cam bar 60 is flush with the inner side edge of the section 5. The inwardly inclined intermediate portion 62 of the cam bar 60 provides means for shifting the hook bars 42 transversely of the machine and in a direction towards the section 4 of the platform, see Figure 5 for the purpose of having the bills 46 of the hooks 45 to enter between the shell and the meat of the shrimp under such conditions fastening the shell to the carrier. The bars 42 are successively shifted in the direction referred to and for the purpose set forth by the intermediate portion of the cam bar 60, see Figure 5. Adjustably secured to the end portion 61 of the cam bar 60 is an L-shaped guide and holder 64 having the longitudinal arm 65 thereof opposing and spaced from the combined guide and abutment 38, during the travel of the carriers. The horizontal arms 66 of the guide 64 is formed with a lateral slotted extension 67, through which extends holdfast devices 68 whereby the guide 64 can be adjusted relative to the combined abutment and guide 38. The guide 64 is rounded, as at 69 between the arms 65 and 66 and which facilitates the passage of the shrimp. The combined abutment and guide 38 is positioned at one side of the shrimp and the arm 65 of the guide 64 at the other side of the shrimp. The arm 65 is arranged over the body portion of the carrier 32.

The intermediate portion 62 of the cam bar 60 as before stated, shifts the hook-carrying bars 42 transversely of the body portion 34, of the carrier 32 so that the hooks 46 will engage in the shrimp, between the meat and the shell for maintaining the shell on the carrier 32 and the movement as before stated is in a direction towards the section 4 and in this connection it will be stated that as the carrier 32 moves forwardly the bevelled ends 44 of the bars 42 ride against the intermediate portion 62 of the cam bar 60 and provide for the shifting action as stated. The end portion 63 of the cam bar 60 will maintain the hook bars 52 for a predetermined period in such shifted position as shown in Figure 6. To move the bars 42 in the opposite direction, a cam 70 is provided and which is engaged by the bevelled ends 43 of the bars 42 and successively shifts such bars to the position shown at the left of Figure 2. The cam 70 is secured to the section 4 at a point adjacent the forward end of said section and rearwardly of and in proximity to the enlarged end portion 15 of the opening formed between the sections 4 and 5, see Figure 6. The holdfast devices for securing the cam in position are indicated at 71. When the bars 42 are shifted by cam 70 to the position shown at the left of Figure 2, the bills 46 of the hooks 45 are moved clear of the shell of the shrimp and the latter will be released from the carrier 32 and as the latter is moved forwardly by the conveyor 38 the shell will be dumped from the carrier as the latter moves around the forward end of the conveyor. The ends of the supports 10, 11 are downwardly curved. The shell of the shrimp is indicated at 72, the severed head thereof at 73 and the latter is dumped from the holder 33 as the latter passes around the forward end of the conveyor 38.

Depending from the section 5 of the platform, see Figure 1 are shaft hangers 74, 75 and journaled therein is a longitudinally extending shaft 76 provided at its forward end with a bevelled gear 77 meshing with and driven from the bevelled gear 31. The shaft 76 carries a bevelled gear 78 and a circular disk 79 provided with a pair of oppositely disposed studs 80, 81 which are diametrically opposed and arranged on opposite sides of the disk 79. The function of the bevelled gears 78 and disk 79 will be presently referred to.

Mounted on the section 5 of the platform is a counterbalanced holder element and a spring controlled scraper element. The function of the holder element is to press upon the shrimp to hold it in place on the carrier and that of the scraper element is to remove the feelers and fins during the travel of the carrier and in advance of cutting off the head and removing the meat 82 from the shell 72. The holder element consists of a shank 83 provided at its inner end with a wheel 84 providing a counterbalance for the shank 83 and said wheel 84 is intermittently raised to provide a clearance for the head of the shrimp 41 and the combined hook and cutter. When the wheel 84 is lowered by gravity, it falls on the shrimp rearwardly of the head and rests on the shrimp 41 to hold it as it is being moved forwardly for the purpose of scraping off the feelers and fins, the cutting off of the head, and separating the meat from the shell. The outer end of the shank 83 is provided with a right angular extension 85, which projects forwardly and is journaled in a bearing 86 secured upon the upper face of the section 5. The extension 85 terminates in a depending arm 87, which extends through a slot 88, formed in the section 5. The arm 87 is arranged in the path of the stud 81 whereby during the revolving of the disk 79 the stud 81 will engage the arm 87, and lift the holder element to the dotted line position shown in Figure 3. When the holder element is in the dotted line position a clearance is had for the passage of the combined hook and cutter formed by the elements 55 and 56. When the pin or stud 81 clears the arm 87, the wheel 84 will fall by gravity and the shank 83 will seat in a notch or recess 88 formed in the top edge of the arm 65 of the guide 64.

The holder element is arranged rearwardly of the scraper element and the latter is referred to generally by the reference character 89 and comprises a spring controlled slidable bar 90, mounted in keepers 91 secured upon the upper face of the section 5, and the latter below the bar 90 is formed with a rectangular slot 92, which registers with an opening 93 formed in the bar 90. The inner end of the bar 90 is provided with a scraper device 94 for removing the fins and feelers from the shrimp as the latter is conveyed forwardly. The normal position of the scraper is as shown in Figure 5, and is withdrawn from such position, to provide for the clearing of the combined hook and head cutter and for such purpose a shifting arm is provided. The shifting arm is indicated at 95 and extends up through the slot 92 and into the opening 93. The arm 95 is pivotally connected as at 96, upon a hanger 97 depending from the section 5. The arm 95 is formed with a pin 98 to which one end of a controlling spring 99 is connected. The other end of the spring 99 is secured to a hanger 100 which depends from the section 5. The spring 99 functions to normally retain the arm 95 in the position shown in Figure 3. The arm 95 depends a substantial distance below its pivot 96 and is positioned in the path of the stud or pin 80 whereby when the disk 79 is revolved the pin or stud 80 engaging with the lower end of the arm 95 will shift the upper end thereof outwardly, against the action of the controlling spring 99. When the upper end of the arm 95 is shifted outwardly, the bar 90 is moved to the dotted line position shown in Figure 3 and which provides a clearance for the combined hook and cutter. When the stud or pin 80 clears the lower end of the arm 95, the spring 99 will provide for the shifting of the bar 90 inwardly so that the scraper device will engage the side of the shrimp 41 and remove the fins and feelers. The scraper device 94 operates below the wheel 84.

Arranged forwardly with respect to the spring controlled scraper element and over the section 5 of the platform, is a picker element for removing the meat 82 from the shell 72. The picker element is of the revolving type and is operated from the shaft 76 by the action of the gear 78 meshing with and driving a bevelled gear 101, carried on the lower end of a vertically disposed shaft 102, which extends through the section 5 and also through a depending bearing sleeve 103 carried by said section 5. Surrounding the shaft 102 and fixed to the section 5 is a cam 104 and secured to the lower face of the platform 5 and spaced from the cam 104 is a directing member 105. Mounted on the upper end of the shaft 102 is a horizontally revoluble disk 106 which is operated by the shaft 102 and is formed with a curved slot 107 in proximity to its perimeter. Pivotally mounted at one end, as at 108 is a curved picker arm 109 provided with a set of spaced curved picker fingers 110 which extend from the outer edge of the arm 109. The arm 109 carries a depending pin 111, which operates in the slot 107 and travels against the edge of the cam 104 and is directed by the member 105. Secured to the section 5 is a brush or scraper 112 for removing the meat 82 from the picker fingers 110. From the construction of picker element as aforesaid, on the revolving of the disk 106 the picker bar 109 will be swung outwardly and the curved pointed picker fingers will catch the meat separating it clear of the shell and passing it over the scraper employed to free it of any pieces of shell left clinging thereto. The cam 104 guides the picker bar 109 in its movement and as the disk 106 revolves the picker fingers will be moved clear of the meat 82 when the latter is acted upon by the scraper or brush 112.

From the foregoing construction and arrangement of parts on the operation of the conveyor the following steps will be had in sequence with respect to each shrimp and which are the quickly securing of the shrimp or fastening it in position, freeing the meat at the tail portion of the shrimp, severing the head from the body, scraping the feelers or fins from the body, separating or removing the meat from the shell of the body and discarding the shell and severed head, and therefore it is thought the many advantages of a machine in accordance with this invention and for the purpose referred to, can be readily understood, and although the preferred embodiment of the invention is as illustrated and described, yet it is to be understood that changes in the details of construction can be had which will fall within the scope of the invention as claimed.

What I claim is:

1. A machine for separating the meat from the shell of a Crustacea comprising an endless conveyor, a carrier secured thereto and including means for detachably fastening the shell thereto, a holder bodily carried by the conveyor, positioned forwardly of the carrier and provided with head severing means, means for scraping off the fins and feelers during the travel of the carrier, a revoluble meat picker element for removing the meat from the shell during the travel of the carrier, and means for shifting said fastener means to and from fastening position with respect to the shell.

2. A machine for separating the meat from the shell of a Crustacea comprising an endless conveyor, a carrier secured thereto and including means for detachably fastening the shell thereto, a holder bodily carried by the conveyor, positioned forwardly of the carrier and provided with head severing means, means for scraping off the fins and feelers during the travel of the carrier, a revoluble meat picker element for removing the meat from the shell during the travel of the carrier, means for shifting said fastener means to and from fastening position with respect to the shell, said carrier including a clamping lever for the Crustacea and a combined guide and abutment for the latter, a stationary guide free of the carrier and coacting with said combined guide and abutment, and a pivoted holder free of the carrier.

3. A machine for separating the meat from the shell of a Crustacea comprising an endless conveyor, a carrier secured thereto and including means for detachably fastening the shell thereto, a holder bodily carried by the conveyor, positioned forwardly of the carrier and provided with head severing means, means for scraping off the fins and feelers during the travel of the carrier, a revoluble meat picker element for removing the meat from the shell during the travel of the carrier, means for shifting said fastener means to and from fastening position with respect to the shell, said picker element arranged forwardly of said scraper means.

4. A machine for separating the meat from the shell of a Crustacea comprising an endless conveyor, a carrier secured thereto and including means for detachably fastening the shell thereto, a holder bodily carried by the conveyor, positioned forwardly of the carrier and provided with head severing means, means for scraping off the fins and feelers during the travel of the carrier, a revoluble meat picker element for removing the meat from the shell during the travel of the carrier, means for shifting said fastener means to and from fastening position with respect to the shell, said carrier including a clamping lever for the Crustacea and a combined guide and abutment for the latter, a stationary guide free of the carrier and coacting with said combined guide and abutment, a pivoted holder free of the carrier, said picker element arranged forwardly of said scraper means and the latter arranged forwardly of said stationary guide and pivoted holder.

5. In a machine for the purpose set forth, a picker element comprising a horizontally disposed revoluble disk, a picker arm pivotally connected thereon and provided with a set of outwardly extending curved picker fingers and further provided with a depending pin, and a cam arranged below the disk and having its edge coacting with said pin.

6. In a machine for the purpose set forth a head cutter comprising a revoluble base formed of an upstanding cutter member provided with a series of superposed spaced tines of curved contour extending from one edge of the cutter member.

7. In a machine for the purpose set forth a travelling carrier comprising a grooved body portion, transversely shiftable hook-carrying bars mounted in the grooves of the body portion and provided at one end with a hook having its bill spaced from and opposing the upper face of the bar, means for maintaining said bars in said grooved body portion, and an upstanding combined guide and abutment positioned on the top of the body portion.

8. In a machine for the purpose set forth a travelling carrier comprising a grooved body portion, transversely shiftable hook-carrying bars mounted in the grooves of the body portion and provided at one end with a hook having its bill spaced from and opposing the upper face of the bar, means for maintaining said bars in said grooved body portion, an upstanding combined guide and abutment positioned on the top of the body portion, each of said bars having the ends thereof oppositely bevelled.

9. In a machine for the purpose set forth a travelling carrier comprising a grooved body portion, transversely shiftable hook-carrying bars mounted in the grooves of the body portion and provided at one end with a hook having its bill spaced from and opposing the upper face of the bar, means for maintaining said bars in said grooved body portion, an upstanding combined guide and abutment positioned on the top of the body portion, and a clamping lever pivoted upon the top of said body portion at the rear thereof.

10. In a machine for the purpose set forth a travelling carrier comprising a grooved body portion, transversely shiftable hook-carrying bars mounted in the grooves of the body portion and provided at one end with a hook having its bill spaced from and opposing the upper face of the bar, means for maintaining said bars in said grooved body portion, an upstanding combined guide and abutment positioned on the top of the body portion, a clamping lever pivoted from the top of said body portion at the rear thereof, and each of said bars having the ends thereof oppositely bevelled.

11. In a machine for the purpose set forth a spring controlled scraper element for the feelers and fins of Crustacea comprising a spring controlled slidable bar provided at its inner end with a scraper device and intermediate its ends with a slot, a spring controlled pivoted member operating in said slot for shifting said bar against the action of its controlling spring, and means for intermittently operating said member.

12. In a machine for the purpose set forth a counterbalanced holder element comprising a shank provided at its inner end with a wheel, said shank formed with a right angularly disposed extension at its outer end terminating in a depending arm, a bearing for said extension, and means engaging with said arm for intermittently elevating said wheel.

13. In a machine for the purpose set forth a travelling carrier provided with transversely shiftable fastening means for the Crustacea, means operating against one end of said fastening means for shifting the same to fastening position, and means operating against the other end of said fastening means for shifting it from fastening position.

14. In a machine for the purpose set forth a travelling carrier provided with transversely shiftable fastening means for the Crustacea, means operating against one end of said fastening means for shifting the same to fastening position, means operating against the other end of said fastening means for shifting it from fastening position, the said means for shifting said fastening means from fastening position further including means for maintaining said fastening means in fastening position for a predetermined period.

15. A machine for the purpose set forth comprising a travelling carrier including means for detachably connecting the body portion of the Crustacea thereto, a bodily conveyed, revoluble cutter for severing the head of the Crustacea forwardly of the carrier, means for intermittently operating said cutter, and a revoluble picker element for removing the meat from said body portion during the travel of the carrier and free of connection with the latter.

16. A machine for the purpose set forth comprising a travelling carrier including means for detachably connecting the body portion of the Crustacea thereto, a bodily conveyed, revoluble cutter for severing the head of the Crustacea forwardly of the carrier, means for intermittently operating said cutter, a revoluble picker element for removing the meat from said body portion during the travel of the carrier and free of connection with the latter, and a feeler and fin remover acting on said body portion during the travel of the carrier, in advance of the action of the picker element and free of connection with said carrier.

17. A machine for the purpose set forth comprising a travelling carrier including means for detachably connecting the body portion of the Crustacea thereto, a bodily conveyed, revoluble cutter for severing the head of the Crustacea forwardly of the carrier, means for intermittently operating said cutter, a revoluble picker element for removing the meat from said body portion during the travel of the carrier and free of connection with the latter, and a combined brush and scraper coacting with said picker element for removing the meat therefrom.

18. A machine for the purpose set forth comprising a travelling carrier including shiftable hook devices for detachably connecting the body portion of the Crustacea thereto, a bodily conveyed, revoluble cutter for severing the head of the Crustacea in advance of said carrier, means for operating said cutter during the bodily conveying thereof, a revoluble meat picker element for removing the meat from said body portion during the travel of the carrier and free of connection with the latter, means for shifting said devices to and for maintaining them in connecting position with respect to the body portion of the Crustacea for a predetermined period, and means for shifting said hook devices free of the body portion of the Crustacea.

19. A machine for the purpose set forth comprising a travelling carrier including shiftable hook devices for detachably connecting the body portion of the Crustacea thereto, a bodily conveyed, revoluble cutter for severing the head of the Crustacea in advance of said carrier, means for operating said cutter during the bodily conveying thereof, a revoluble meat picker element for removing the meat from said body portion during the travel of the carrier and free of connection with the latter, means for shifting said devices to and for maintaining them in connecting position with respect to the body portion of the Crustacea for a predetermined period, means for shifting said hook devices free of the body portion of the Crustacea, and a feeler and fin remover device acting on said body portion during the travel of the carrier, in advance of the action of the picker element and free of connection with the carrier.

20. A machine for the purpose set forth comprising a travelling carrier including shiftable hook devices for detachably connecting the body portion of the Crustacea thereto, a bodily conveyed, revoluble cutter for severing the head of the Crustacea in advance of said carrier, means for operating said cutter during the bodily conveying thereof, a revoluble meat picker element for removing the meat from said body portion during the travel of the carrier and free of connection with the latter, means for shifting said devices to and for maintaining them in connecting position with respect to the body portion of the Crustacea for a predetermined period, means for shifting said hook devices free of the body portion of the Crustacea, a feeler and fin remover device acting on said body portion during the travel of the carrier, in advance of the action of the picker element and free of connection with the carrier, and a counterbalanced intermittently shifted holding element pressing on said body portion during the travel of the carrier.

In testimony whereof, I affix my signature hereto.

FRANK C. BUCKNAM.